United States Patent Office 2,792,117
Patented May 14, 1957

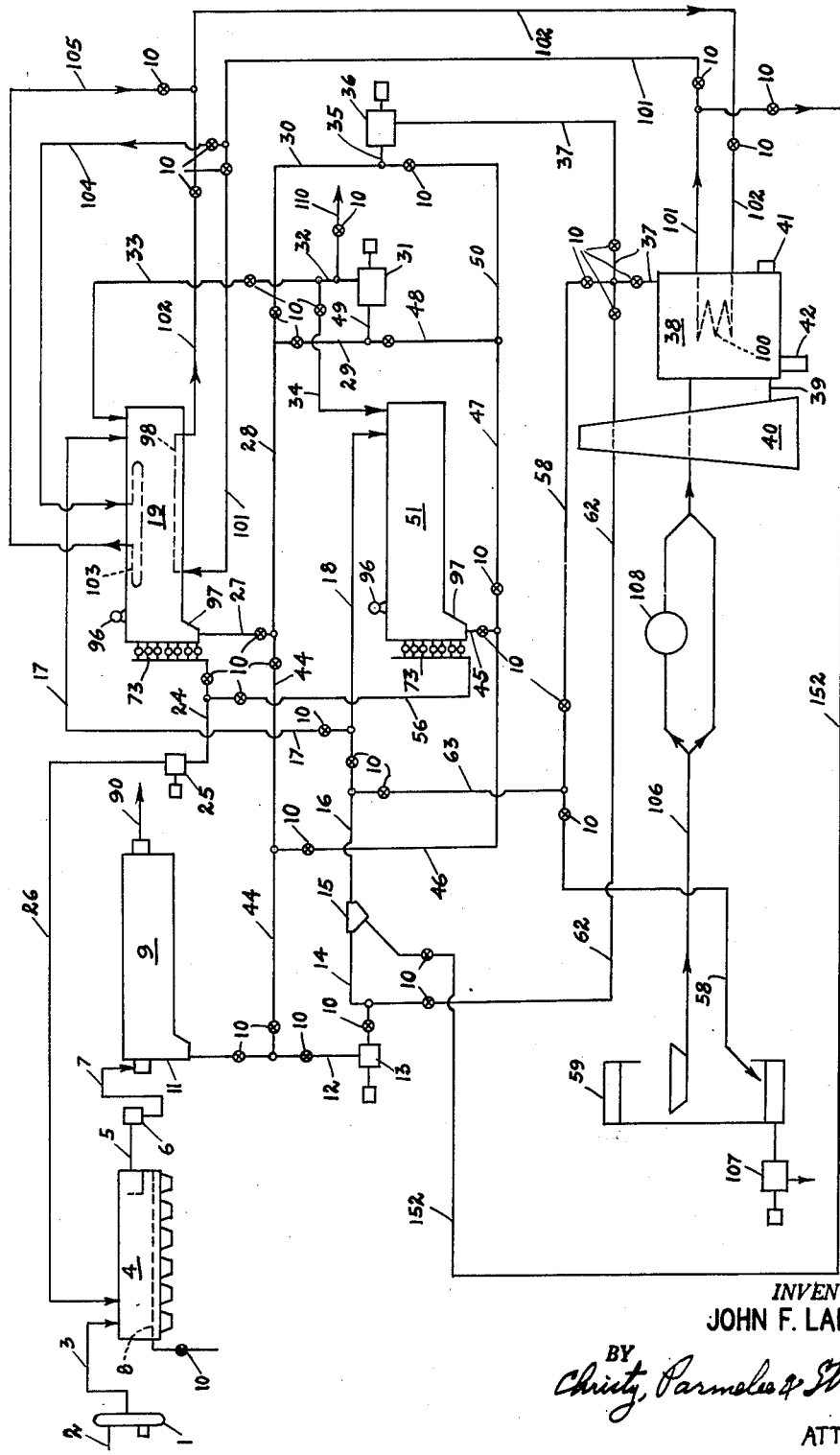

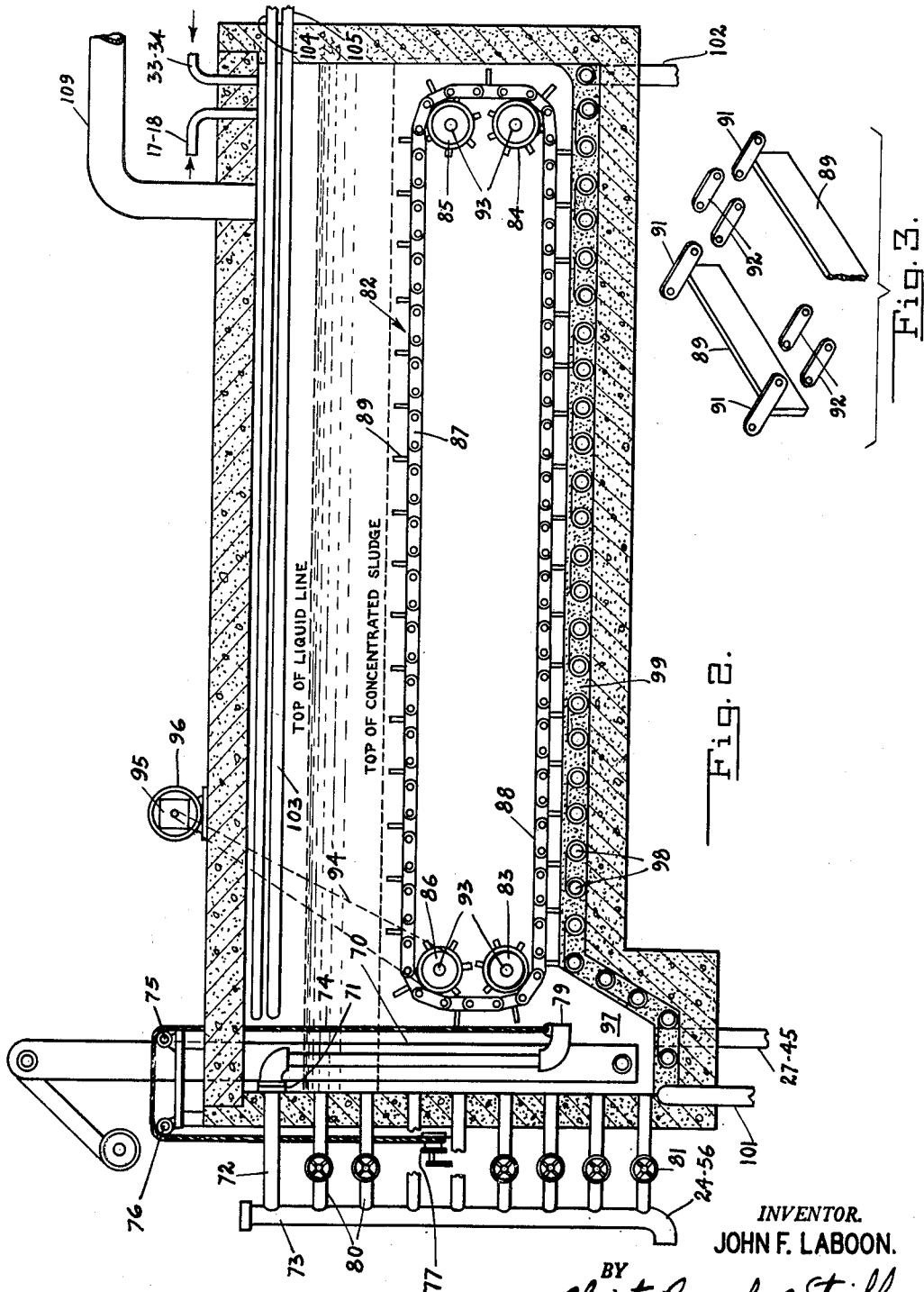

2,792,117

APPARATUS FOR SEWAGE TREATMENT

John F. Laboon, Mount Lebanon Township, Allegheny County, Pa.

Application October 13, 1954, Serial No. 462,039

4 Claims. (Cl. 210—218)

My invention relates to sewage treating systems, and consists in certain new and useful improvements in apparatus for treating or disposing of sewage.

The art is familiar with various methods of treating sewage, industrial wastes and other organic pollution, such as:

1. Screening raw sewage and wastes to remove paper and other inclusions that do not require elaborate treatment prior to disposal.

2. Removing grit and other particles of hard solid matter that are entrained in sewage. Such removal of hard solid matter is accomplished by sedimentation in a so-called grit tank.

3. Pre-aeration of the sewage and wastes, to promote the activities of aerobic micro-organisms. The aeration of the sewage is accomplished by bubbling air through the sewage in the grit and pre-aeration tanks.

4. Comminuting the sewage and wastes drawn from the grit and pre-aeration tanks for further treatment.

5. Processing the comminuted sludge in a settling tank, causing the solids in the sludge to settle to bottom of the tank and drawing off and disposing of the surplus liquid. The sediment remaining forms a raw or primary sludge.

6. The raw or primary sludge is concentrated by sedimentation in a concentration tank. The supernatant liquid is disposed of, and the concentrated sludge is treated in either or both of the following ways: (a) The concentrated sludge is placed in a digester tank, in which bacteria ferment and digest the concentrated sludge producing in the process a fuel gas, plus a supernatant which requires treatment for disposal, and plus a digested or final sludge. (b) Elutriating and mixing chemicals with the concentrated sludge, thereby producing a sludge which can be readily de-watered by mechanical means and resulting in a filtrate which requires further treatment, plus a final sludge-cake.

7. The wet digested or final sludge is disposed of in any of the following ways: (a) The digested sludge is pumped or otherwise transported to a disposal point, such as a river, ocean, lake or lagoon. (b) The de-watered sludge-cake is dried and prepared for disposal as a fertilizer. (c) The digested and de-watered sludge is introduced to an incinerator, in which it is dried and burned. The ash produced in the incinerator presents no disposal problem. (d) The undigested concentrated sludge is introduced to an incinerator in which it is dried and burned, this practice requiring the use of substantial quantities of supplemental fuel for drying. The ash produced in this practice presents no disposal problem. (e) The undigested concentrated and mechanically de-watered sludge is introduced to an incinerator, in which it is dried and burned, this practice requiring no supplementary fuel except such as is necessary in heating incinerators in preparation for operation.

In my copending application for Letters Patent, Serial No. 167,170, filed June 9, 1950, of which the present case comprises a continuation-in-part, I illustrate and describe a sewage treating system that advantageously eliminates the need of elutriation, chemical conditioning and de-watering of sludge in a vacuum filter, or the like, preparatory to incinerating or other final disposition. Major features of the invention disclosed in such copending application consist in: (1) The concentration or agglomeration of the primary or raw sludge by means of thermally conditioned bacteria that produces a relatively quick flotation of the sludge; (2) mixing to uniform consistency the concentrate or agglomerate obtained by flotation; and (3) directly disposing of such thoroughly mixed sludge concentrate, the latter step being predicated upon the discovery that a thoroughly mixed sludge concentrate can be directly incinerated. This is all achieved with minimum requirements of equipment and labor, and a great reduction in the essential time for the treatment or disposal per unit quantity of sewage. And in those instances where the fuel gas generated in a digester is desired, the sludge concentrate produced in my apparatus and procedure permits of a very much more efficient operation of the digester, which can be reduced substantially in actual size because of the materially reduced quantities of sludge (due to concentration) the digester is required to accommodate, producing a final sludge that may be directly eliminated in an incinerator, or disposed of in any of the conventional ways.

Whereas the invention set forth in my said copending application consists in improvements in process based upon the discovery that a sludge concentrated by floatation and thoroughly mixed to uniform consistency can be effectively de-watered and converted into sluge cake for incineration, without the necessity of elutriation, chemical treatment, or digestion, as has been hitherto the normal practice in the case of sludges produced in settling or concentration tanks, my present invention is directed to certain new and useful improvements in apparatus for the use and practical enjoyment of such discovery. The savings in chemicals alone for a sewage disposal system of a city of one million population is estimated at more than $50,000.00 per year.

The practice of the method of my copending application embraces the fact that the greatest speed in the concentration of chemically untreated sewage sludge may be effected at temperatures within the range of from 35° C. to 55° C., understanding that the process may be carried on at a somewhat slower rate in the temperature range of from 20° C. to 35° C.

Apparatus embodying my present invention will be understood upon reference to the accompanying drawings, in which:

Fig. 1 is a diagrammatic view of a sewage disposal system, providing an exemplary embodiment of the invention;

Fig. 2 is a fragmentary view, partly in side elevation and partly in vertical section, of a certain sludge concentration tank that forms an essential unit of the sewage disposal system of the invention; and Fig. 3 is an "exploded" isometric view of a portion of the sludge-mixing mechanism installed in the concentration tank.

Referring to the drawings, the structures of most of the various pieces of equipment incorporated in my sewage disposal system are well known in the art, with the exception of the improved units particularly described herein, and, since this invention is particularly directed to a new and more effective organization of apparatus and equipment for treating sewage, the diagrammatic showing of Fig. 1 will suffice for those skilled in the art, without unduly involving and prolonging this specification.

The raw sewage to be disposed of enters the system through a sewer main or duct 2, whence it passes through a screening apparatus 1 that removes paper and other inclusions that do not require special treatment prior to disposal. From the screening apparatus 1 the raw sewage enters a pre-aeration and grit tank 4, by way of a pipe 3. The sewage is collected in a body of substantial volume in this tank, and air is introduced through a pipe 8 and caused to bubble upward through the body of sewage, thus promoting the beneficial activities of aerobic micro-organisms upon the raw sewage. In the tank 4 the usual grit contained in sewage is settled and removed.

From tank 4 the sewage is delivered by pipe 5 to a comminutor 6, where lumps and coarse material are broken into small particles, to provide a fluid of a consistency promotive of accelerated settling and sludge concentration. Pipe 7 delivers the sewage to a settling tank 9, in which the solids in the sewage settle to the bottom of the tank to form what may be termed a primary sludge that is inherently subject to biological activity, particularly when thermal conditions are adjusted and maintained at beneficial value, as will presently appear. The relatively clear supernatant is withdrawn from the settling tank through a line 99 leading to a suitable point of disposal, such as a stream, an ocean, a lake, or another place of disposal or treatment, with which this invention is not concerned. From tank 9 the primary sludge is, by means of a motor-driven primary sludge pump 13, selectively delivered either through a primary sludge line 11, 12, 14, 16, 17 to a sludge-concentrating tank 19, or through a primary sludge line 11, 12, 14, 16, 18 to a sludge-concentrating tank 51. The level to which this primary or sedimentation sludge is filled in the tanks 19 and/or 51 is indicated by the legend "Top of liquid line" in Fig. 2. On the delivery side of pump 13 means are provided for heating the sludge. Such means may comprise a heater in the form of a heat exchanger, or a steam or hot water injector, devices well known in the art. In this case a steam injector 15 is shown, and by the injection of steam into the sludge propelled by pump 13 the sludge is raised to a temperature of from 20° C. to 55° C.

The body of heated primary sludge in the concentration tanks 19 and 51 is allowed to stand for a period of from two to five days, or more, during which time certain bacteritic and physical reactions occur in the sludge, effecting the generation of gases in the agglomeration of the solid components of the sludge. The agglomerated substance seems to become cellular, and apparently the generated gases occupy the cells, and displace water from the agglomerate. In the course of several days the cumulative result is that the agglomerate becomes very buoyant, with the effect that the contents of the tank stratify, forming a sludge concentrate of from 80 to 90 percent moisture content that rises and floats upon a pool of subnatant liquid. Experiments indicate that, when the primary sludge is maintained at a temperature of from about 35° C. to 55° C., this concentration of sludge by flotation may be brought about in approximately two days or less. In this temperature range facultative thermophilic organisms operate with maximum speed to achieve the results indicated. If the temperature is lower, a longer time is required. At from 20° C. to 35° C. mesophilic organisms are effective to the ends in view.

As soon as the sludge concentrate is formed the subnatant liquid is, by means of a pump 25, drawn from the concentrating tank 19 through line 24 and returned to the pre-aeration and grit tank 4 by way of a line 26. In the case of the concentrating tank 51, the pump subcants or draws off the subnatant water through a line 56. The level of the de-watered flotation sludge is indicated by the legend "Top of concentrated sludge" in Fig. 2.

Referring to Fig. 2 the structure of the sludge-concentrating tanks is illustrated on larger scale than in Fig. 1.

Such tanks are shown in this case to be of concrete construction. Preferably, the subnatant liquid is withdrawn from each tank 19 and 51 as soon as it has stratified to the point where it may be withdrawn without including undue quantities of solids. To the end that the liquid may be subcanted at precisely the proper level below the surface of the sludge, a suction-tube 70 is pivotally connected, as by a swivel joint 71, to a tube 72 connected to a stand-pipe 73, which in turn is connected to the subnatant pump line 24. Means are provided for swinging the suction-tube 70, and such means may comprise a chain or cable 74 connected at one end to the distal end of the suction-tube, whence the chain extends outwardly through the top of the tank, and is trained over sheaves 75 and 76 and attached to a hand winch 77 mounted on the outside wall of the tank. By means of the winch the suction-tube 70 may be manually swung on the axis of joint 71 so that the inlet end 79 of the suction-tube may be brought to the exact elevation of the sludge body where liquid is most advantageously removed under the suction of pump 25.

Each sludge-concentrating tank may also, and/or alternately, be provided with a series of connector pipes 80 that open between the tank and the stand-pipe 73 at vertically spaced intervals. Each connector pipe is provided with a valve 81 that is normally closed, but which may be opened in that connector pipe which is at the elevation at which liquid is to be subcanted from the tank under the effect of pump 25.

When all subnatant liquid has been removed from the tank (19 or 51) the sludge, which has been concentrated by flotation, forms a layer upon the floor of the tank. In accordance with this invention such sludge concentrate is thoroughly mixed that is, mixed to a condition of uniform consistency, as by means of an endless paddle chain 82 trained over four sprocket wheels 83, 84, 85 and 86 to extend in upper and lower flights, 87 and 88, respectively. In Fig. 3 a convenient type of paddle chain structure is indicated. The paddles 89 of the chain may carry rigidly at their opposite ends chain links 91, and paired interconnecting links 92 are articulated between the successive paddle links to form the endless chain structure. In effect the assembled structure comprises two endless chains extending one against or near the inner face of each side wall of the tank, with the paddles 89 extended across the width of the tank. There is a set of sprocket wheels 83—86 for each of the two chains in the paddle chain structure, and the sprocket wheels are borne pair by pair upon shafts 93 journaled in pillow blocks mounted on the tank walls. The shaft of the pair of sprocket wheels 86 is geared by a chain or belt 94 to a speed reducer 95 driven by a reversible electric motor 96, subject to the control of a suitable push-button station, not shown.

The paddle chain driven by the reversible motor performs a dual function. It serves first as a mixing instrumentality, and then as means for sweeping the mixed sludge into a discharge sump 97 at one end of the tank. When the concentrated sludge has been deposited, as said, upon the bottom of the tank, the motor 96 is energized, to drive the paddle chain in such direction that the lower flight 88 of paddles travels in left-to-right direction, as viewed in Fig. 2. This causes the lower paddles to sweep the sludge toward the right-hand end of the tank, where the sludge piles against the end wall of the tank, and is thoroughly blunged by the action of the paddle rounding the sprocket wheels 84, 85. In this way the concentrated sludge is mixed and reduced to a uniform consistency, with the water content the same throughout the mass. Further mixing may in some cases be desirable, and this is accomplished by means of additional mixing apparatus in the form of a motor-driven pump 31, which can be a displacement pump, or in some cases a centrifugal pump or other known type of sludge-propelling or mixing device.

The pump 31 may be termed a sludge circulating pump. The intake of the pump is connected to the discharge sump 97 of tank 19 by means of a delivery line 27, 28, 29, 49, while line 45, 47, 48, 49 connects the intake of such pump with the discharge sump of tank 51. When the sludge has been fully blunged in a concentrating tank, the motor 96 of the tank is reversed, thereby driving the paddle chain in such direction that the paddles in the lower flight 88 advance from right to left, as viewed in Fig. 2, with the effect that the sludge concentrate is swept and scraped by the lower line of paddles into the discharge sump 97 of the tank, whence it is drawn through the sludge delivery line described into the pump 31 and then discharged into a line 32. The impeller of the pump serves not only to propel the sludge, but also to effect a further or complete mixing of the sludge to uniform consistency. From line 32 the sludge is returned to the tank (19 or 51) from which it was drawn, the return flow being by way of a line 33 in the case of tank 19, and a line 34 in the case of tank 51. The circulating flow of sludge from the tank, through pump 31 and back into the tank may be continued until an exceedingly uniform consistency of the sludge concentrate has been attained.

The pump 31 and the pipe lines described may also be used to transfer the sludge concentrate from one concentrating tank to the other, etc.

It will be noted that the pipe lines throughout the sewage disposal system include appropriately placed valves 10 that may be opened or closed to provide for any of the various courses of flow described.

In those instances where a refined sludge may be dumped in a lagoon or river, lake, or ocean, the mixed sludge may be pumped from the concentrating tanks through a pipe line 110 to such point of disposal, or may be loaded in barges or tank cars for transportation to the disposal area.

In those cases where incineration of sewage sludge is required in a plant of lowest capital investment, the mixed sludge concentrate may be introduced without vacuum filtering, chemically treating, or other processing, directly into an incinerator 38, alternatively such sludge concentrate, without elutriation or chemical treatment, may be substantially completely de-watered or converted into sludge cake on a conventional vacuum filter 59, prior to introduction to the incinerator. The transportation of the mixed sludge concentrate from the tank 19 or 51 may be effected by means of a clamshell bucket, or a screw and/or bucket conveyor, apparatus well known in the art. However, in the illustrated system a pumping cycle is preferred. More particularly, a motor-driven pump 36 is provided for pumping and mixing the sludge from either concentrating tank through a delivery line 37 leading to the incinerator 38. The reference numerals 27, 28, 30, 35, 36, 37 indicate the line of flow from tank 19 to the incinerator, and the numerals 45, 47, 50, 35, 36, 37 indicate the line of flow from tank 51 to the said incinerator. Preferably, however, the mixed sludge is pumped into the vacuum filter 59 through a connecting line 58, and in known way this filter, under the suction of a vacuum pump 107, removes all free water from the sludge delivered by line 58, forming what is known as sludge cake. The sludge cake produced in unit 59 is conveyed over a path 106 to the incinerator, or over a path leading through a comminutor 108 for breaking up the cake prior to entering the incinerator.

The incinerator may be any one of known types, and a stack 40 is arranged to draw through a flue 39 the products of combustion developed in the incinerator. The ash from the incinerator is removed through a duct 42.

Certain of the improvements described in the foregoing specification are to be noted as important features. For example, in warm weather the primary sludge entering the concentration tanks 19 and 51 may be heated to the specified optimum temperature simply by subjecting the sludge (on its way from the settling tank 9 to the concentrating tank 19 or 51) to the effect of the heater or steam injector 15 once. However, in cold weather further heating of the sludge may be very desirable. This further heating is effectively obtained by the provision of a by-pass line 44 from the sludge concentrate delivering line 27 of tank 19 to the primary sludge line 11, 12 on the inlet side of pump 13. A corresponding by-pass line 46 leads from the delivery line 45 of tank 51 through line 12 to the inlet of pump 13. Accordingly, the sludge initially heated and stored in either concentrating tank may be recirculated and subjected as often as need be to the heater 15, whereby the entire body of primary sludge may be brought to specified temperature uniformly throughout the concentrating tank in which it is contained.

Advantageously, provision is made for maintaining the body of sludge in the concentrating tanks within 1° C. of the specified temperature. Means to this end comprise heating tubes or coils 98 incorporated or embedded within the floor 99 of the tank, as shown in Fig. 2. The heat for these coils may be furnished by steam or water, heated in a boiler or heat-exchange tubing 100 (Fig. 1) in the incinerator 38, and circulated through pipes 101 and 102 leading respectively to and from the heating coils 98. It is important to note that the heating coils are incorporated within the structure of the floor of each tank, where they are not exposed to the accumulation and encrustation of sludge upon their bodies. Such sludge as may tend, under the effect of the heat of coils 98, to become caked on the floor of the tank is readily scraped loose and worked into the consistency desired by the action of the lower flight 88 of the paddle chain in operation.

As a still further provision against heat radiation losses, a heating coil 103 may be applied against the inner surface of the cover or roof of each concentration tank, and, as shown in Fig. 2, this coil may receive circulating hot water or steam by way of a pipe 104 and deliver it by way of a pipe 105. In fact the pipes 104 and 105 may comprise branches of the hot water or steam lines 101 and 102 leading from the incinerator, as shown in Fig. 1. The hot fluid-supply lines 101 and 102 have been shown in Fig. 1 connected to tank 19 only, and it will be manifest how such lines may also be connected to the coils 98 and 103 (Fig. 2) of tank 51.

The heated coil 103 not only serves to inhibit a loss in temperature of the sludge contained in the concentrating tank, but also serves to heat the air or atmosphere in the top of the tank. This heated atmosphere in the upper portion of the tank serves to dry the surface of the sludge concentrate that rises to the top of the liquid in the tank, thereby forming a crust on the top of the floating sludge. The crust thus formed provides a barrier that reduces the escape of gases formed in the body of sludge, and this in turn promotes to an increased degree the desired concentration of sludge solids by floatation. A vent 109 (Fig. 2) is provided at the top of the concentrating tank for the escape of vapors, and this vent may be connected to the chimney or stack 40. If odors are present, the vented gases may be injected into the combustion chamber of the incinerator and deodorized. This vent may also be used to collect for use the combustible gas generated by the sludge in the concentrating tank.

In modification of, or supplemental to, the heated coil 103, a stream of dry and/or heated air may be directed into the space between the cover of the concentrating tank and the top of the body of sludge in the tank, and this stream of air dries the surface of the layer of floating solids with the desired incrusting effect. The air stream laden with entrained vapors finds egress through duct 109.

In large sewage disposal installations, it will sometimes prove economical and desirable to digest the mixed floatation sludge concentrate and provide for the recovery of the combustible gases that are generated by the digestion of the sludge, since such gases may be used as fuel for electric power generation, or to run gas engines or to serve as fuel for heating, or as fuel for the burner 41 of the incinerator. In such a case, a digester tank may be provided and operated, as described in my copending application.

The digested sludge remaining after the digestion process may be directly delivered to and burned in the incinerator 38, or it may be de-watered in the filter unit 59 before delivery to the incinerator. Alternatively, the de-watered digested sludge may be used in the preparation of commercial fertilizer.

The sludge concentrating tanks 19 and 51 are shown to be rectangular, as viewed in plan, but it will be manifest that circular tanks may be employed, and of course any desired number of concentrating tanks may be provided in given installation.

Within the terms of the appended claims, many other modifications and variations may be made without departing from the spirit of the invention.

Notice is given of my copending application Serial No. 157,989, filed April 25, 1950, now abandoned.

I claim:

1. In a sewage treating system in combination, a settling tank receiving raw sewage and separating by sedimentation primary sludge from the liquid therein, means for removing the supernatant liquid from said settling tank, means for removing the primary sludge from the settling tank, means including a concentration tank which is closed except for material inlets and outlets for receiving the primary sludge and stratifying same into a supernatant liquid containing layer of solids and a lower layer of free liquid by floatation of the solids within the concentration tank, means for withdrawing said lower layer of free liquid from the concentration tank to deposit the strata of floatation solids upon the bottom of the concentration tank and means for removal of the floatation solids from the latter tank for disposal, the outlet for said free liquid withdrawing means and floatation solids removal means both being adjacent the bottom of the concentration tank.

2. The apparatus as defined in claim 1 including means for mixing the strata of floatation solids and its contained liquid to a substantially uniform consistency preparatory to further treatment apart from the concentration tank.

3. The apparatus as defined in claim 1 wherein the concentration tank includes heating means for encrusting the top surface of the floatation solids to retain gases therein increasing the buoyancy of said solids.

4. The apparatus as defined in claim 1 wherein the concentration tank includes means for maintaining the sedimentation solid delivered to the concentration tank at a temperature accelerating formation of gases within the solids to assist in stratification within said latter tank.

References Cited in the file of this patent

UNITED STATES PATENTS

| | | |
|---|---|---|
| 1,990,458 | Marshall | Feb. 5, 1935 |
| 2,094,909 | Baily et al. | Oct. 5, 1937 |
| 2,190,598 | Fischer | Feb. 13, 1940 |
| 2,196,991 | Jacobs et al. | Apr. 16, 1940 |
| 2,246,224 | Streander | June 17, 1941 |
| 2,360,811 | Kelly et al. | Oct. 17, 1944 |
| 2,528,649 | Genter et al. | Nov. 7, 1950 |